2,814,635

PROCESS OF PRODUCING SILICIC ACID ESTERS

Kurt Scheel, Hannover, and Hans Werner Schmidt, Hannover-Kirchrode, Germany, assignors to Kali-Chemie Aktiengesellschaft, Hannover, Germany, a stock company of Germany No Drawing. Application August 4, 1954,
Serial No. 447,934

Claims priority, application Germany August 5, 1953

6 Claims. (Cl. 260—448.8)

The present invention relates to an improved process of producing silicic acid esters and more particularly to a process of producing silicic acid esters from silicon tetrafluoride.

Silicic acid esters are produced in industry by the action of silicon tetrachloride on alcohols. Attempts have been made to carry out said reaction with silicon tetrafluoride. It was found, however, that no ester is formed when proceeding in the same manner as with silicon chloride.

It is one object of the present invention to provide a simple and effective process of producing silicic acid esters from silicon tetrafluoride which process has many advantages over the heretofore used processes.

Other objects of the present invention and advantageous features thereof will become apparent as the description proceeds.

In principle, the process according to the present invention consists in reacting an alcohol with silicon tetrafluoride in the presence of ammonia.

It is of particular advantage to employ silicon tetrafluoride and ammonia in this reaction in such a ratio that, in addition to the desired silicic acid ester, ammonium fluosilicate is produced in accordance with the following reaction equation $$4ROH + 3SiF_4 + 4NH_3 = Si(OR)_4 + 2(NH_4)_2SiF_6$$

In said equation, R indicates the radical of an aliphatic, cycloaliphatic, aliphatic-aromatic, aromatic, or heterocyclic alcohols.

The process according to the present invention can be carried out in many ways. The alcohol to be reacted is preferably used in excess and serves as reaction medium and ammonia is first introduced into said alcohol whereafter silicon tetrafluoride is added until all the ammonia is used up. However, the reverse procedure may also be adopted, i. e. silicon tetrafluoride is first added to the alcohol whereafter the required amount of ammonia is introduced into the mixture. Or ammonia and silicon tetrafluoride, in the required ratio, are simultaneously introduced into the alcohol.

In carrying out the process according to the present invention it is also possible to use, in place of the alcohol, the silicic acid ester of said alcohol or a mixture of said alcohol and its silicic acid ester as reaction medium. According to this embodiment of the present invention ammonia and silicon tetrafluoride are introduced in the required ratio into the alcohol while stirring, until the fluosilicate produced thereby forms a semifluid suspension. The resulting alcohol-silicic acid ester mixture is then separated from the fluosilicate, for instance, by filtration, and fresh amounts of ammonia and silicon tetrafluoride are introduced into said fluid mixture. This operation is repeated until the alcohol has been converted to the desired extent into the corresponding silicic acid ester.

In some instances in which the considerable amount of heat generated during reaction causes disturbing side-effects, it has proved of advantage first to produce the addition compound of silicon fluoride with two mols of ammonia of the formula $SiF_4.2NH_3$ by reacting silicon tetrafluoride with ammonia and then adding said preformed addition compound to the alcohol to be esterified.

It is evident from the above given equation that ammonium fluosilicate is formed as a valuable by-product of the reaction according to the present invention. Said ammonium fluosilicate can be used as such, for instance, for destroying pests. A particularly advantageous embodiment of the present invention, however, involves reconversion of the fluorine content of said ammonium fluosilicate into silicon tetrafluoride and returning said silicon tetrafluoride to the esterification process.

This embodiment of the present invention is preferably carried out by splitting up said ammonium fluosilicate, in the presence of silicic acid, with a difficulty volatile acid, preferably with sulfuric acid or phosphoric acid according to the following equation:

$$2(NH_4)_2SiF_6 + SiO_2 + 2H_2SO_4 = 3SiF_4 + 2(NH_4)_2SO_4 + 2H_2O$$

Combining said equation with the reaction equation as set forth hereinbefore for the silicic acid ester formation, shows that this advantageous embodiment of the present invention enables full utilization and circulation of the silicon tetrafluoride initially required for esterification of the alcohol. By virtue of said recirculation of the silicon tetrafluoride, the only by-products of the process according to the present invention are ammonium sulfate or ammonium phosphate, i. e. salts that can be employed as fertilizer in any available quantity. Since said salts are moreover ordinarily produced in industry from ammonia and sulfuric acid or phosphoric acid, it is evident that only alcohol and silicic acid are actually consumed in the production of silicic acid esters according to the present invention. The production of said esters, therefore, is based on a completely new economic basis, which will open to said esters, on account of their low price, further extensive new possibilities of use.

It might be mentioned that, in place of ammonia, it is also possible to use organic amines, and that the present invention comprises also the use of such amines in the esterification process.

The following examples serve to illustrate the present invention without, however, limiting the same thereto.

Example 1

14 g. of ammonia are first introduced into 300 ml. of completely anhydrous ethanol, thereby carefully excluding any access of air. Thereafter silicon tetrafluoride is introduced into the resulting mixture until all the ammonia is consumed. On heating to 70° C. a jelly-like suspension is formed. The precipitated ammonium fluosilicate is filtered off thereby excluding moisture, washed with anhydrous ethanol and dried, yielding 73 g. thereof. Excess ethanol is removed by distillation from the alcoholic filtrate. Thereafter, the ethyl silicate formed by this reaction is recovered by distillation. Said ester has a boiling point of 165.5° C. 40 g. of said ester, corresponding to a yield of 92% of the theoretical yield are obtained.

Example 2

Silicon tetrafluoride and ammonia in the volumetric ratio of 3:4 are simultaneously introduced in a rapid stream, while stirring, into 1500 ml. of anhydrous methanol. The temperature during their introduction is maintained at about 60–65° C. As soon as the reaction mixture becomes semifluid due to precipitated fluosilicate, gas introduction is discontinued, and first unreacted alcohol and thereafter the silicic acid ester formed are distilled off. 176 g. of ammonium fluosilicate, contaminated by 3 g. of polysilicate, remain in the distillation flask. 70 g. of silicic acid methyl ester having a boiling point of 121° C., corresponding to a yield of 95%, are obtained.

*Example 3*

Silicon tetrafluoride and ammonia are introduced into 1.5 l. of anhydrous ethanol at about 70° C. until the reaction mixture has attained a semifluid consistency. The fluosilicate is filtered off thereby excluding moisture, and is washed by displacement with ethanol until the volume of the filtrate is again 1.5 l. The filtrate is treated in the same way as described above with silicon tetrafluoride and ammonia, the fluosilicate is filtered off and washed with ethanol, silicon tetrafluoride and ammonia are again introduced into the filtrate, and this procedure is repeated until a mixture of ethanol and silicic acid ethyl ester containing about 50% of said ester, is obtained. Said mixture is then subjected to distillation whereby first excess ethanol and thereafter the formed ethyl silicate distills over.

*Example 4*

Into 216 g. of benzylalcohol there are introduced, while stirring, 54 g. of silicon tetrafluoride and a quantity of ammonia sufficient to impart alkaline reaction to the reaction mixture. Thereby the temperature of the reaction mixture increases to about 90° C. The precipitated ammonium fluosilicate is filtered off and washed with benzylalcohol. The filtrate contains 22% of silicic acid benzyl ester, which is isolated in pure form by distillation in a vacuum. Its melting point is 32.5° C. and its boiling point 305° C./12 mm.

*Example 5*

200 g. of cyclohexanol are diluted with 200 g. of benzene. Silicon tetrafluoride and ammonia are passed into said mixture and are reacted with said cyclohexanol in the same manner as described in the preceding example. After filtering off the precipitated ammonium fluosilicate, the cyclohexanol ester of silicic acid is recovered from the filtrate by fractional distillation. Its melting point is 88.5° C. and its boiling point 345° C.

*Example 6*

Using phenol in place of benzylalcohol and proceeding in about the same manner as described in Example 4, yields the phenol ester of silicic acid in pure form. Its melting point is 48° C. and its boiling point 230° C./3 mm.

*Example 7*

Gaseous silicon tetrafluoride and ammonia, in the volumetric ratio of 1:2, are introduced into a dry reaction vessel. The addition compound of the formula $SiF_4.2NH_3$ precipitates as a white, snowy substance. 138 g. thereof are added, while stirring, to 200 ml. of anhydrous ethanol. Due to the reaction taking place thereby, the temperature of the mixture increases. Stirring is continued for 4 hours whereby a temperature of 70° C. is maintained by additional heating. Thereafter, the precipitated ammonium fluosilicate is filtered off. The filtrate, due to the excess of ammonia, is of alkaline reaction and contains 28% of silicate acid ethyl ester which is isolated therefrom in the manner described in the preceding examples.

*Example 8*

Silicon tetrafluoride is passed into an absolutely anhydrous mixture of 158 g. of pyridine and 250 g. of methanol until all the pyridine is combined to form pyridinium fluosilicate which is filtered off and washed with methanol. Silicic acid methyl ester is recovered from the filtrate by distillation and, thus, is obtained in pure form.

*Example 9*

Silicon tetrafluoride is passed into a mixture of aniline and ethanol until all the aniline is combined to form the fluosilicate of aniline which is filtered off and washed with ethanol. Silicic acid ethyl ester is recovered from the filtrate by distillation as described hereinbefore.

According to another embodiment of the present invention, reaction between silicon tetrafluoride, the alcohol to be esterified, and ammonia or amine is carried out in the gaseous phase. This procedure is of particular advantage for the production of silicic acid esters of lower aliphatic alcohols and especially of methanol or ethanol. When producing said esters in the manner as described in Examples 1 to 3, there are produced, as is evident from the reaction equation, only comparatively small quantities of said esters in proportion to ammonium fluosilicate, namely, for instance, only 152 g. of the methyl ester or, respectively, 208 g. of the ethyl ester for 356 g. of ammonium fluosilicate. Consequently, the reaction mixture, when working in the liquid phase, soon starts to become semifluid at low ester concentrations and must be worked up.

According to the above indicated embodiment of the present invention which will be described hereinafter more in detail, high ester concentrations are achieved when proceeding in the gaseous phase. For this purpose the gaseous reactants are conducted, preferably in the volumetric ratio indicated by the reaction equation given hereinbefore, into a reaction chamber the temperature of which is preferably adjusted to such a temperature that no separation of liquid ester can take place. This involves heating of the reaction chamber at the beginning of the reaction. As soon as the reaction proceeds smoothly, it is necessary to cool the reaction chamber since esterification takes place under exothermic conditions.

When operating in this manner, ammonium fluosilicate precipitates as pulverulent snowy mass and is collected in the reaction chamber while the silicic acid ester is condensed in a cooler attached to said reaction chamber.

To achieve complete reaction of silicon tetrafluoride, it is advisable to employ an excess of the alcohol to be esterified, preferably an excess of 10% to 100% depending upon the type of alcohol used. If such an excess of alcohol is used, the temperature of the reaction chamber need not be kept at the boiling point of the ester but may be somewhat lower corresponding to the partial vapor pressure of the ester in the ester-alcohol mixture. In this manner it is possible to advantageously decrease the reaction temperature during the production of esters of higher boiling alcohols. As stated above, it is, of course, essential, in order to quantitatively separate the fluosilicate from the ester, to adjust the temperature of the reaction chamber to such a temperature that separation and precipitation of the ester in liquid form does not take place in said chamber.

Suitable cooling surfaces may be provided in the reaction chamber. The cooling surfaces are preferably also used for heating the chamber, on starting the reaction, to the required reaction temperature. A preferred method of cooling the reaction chamber during reaction, however, consists in utilizing the heat of evaporation of the alcohol to be reacted by injecting said alcohol in the liquid state into the reaction chamber. Such a procedure avoids the disadvantage inherent in cooling surfaces which become gradually ineffective in the course of operation due to incrustation with fluosilicate. Injection of the liquid alcohol has the further advantage that the cooling effect is uniformly distributed over the entire reaction chamber.

According to this embodiment of the present invention the reaction temperature is adusted by the quantity of alcohol injected into the reaction chamber. To avoid too high a dilution of the ester formed, part of the ester or ester-alcohol mixture condensed in the cooler may advantageously be returned to the reaction chamber. It is also possible to dissolve in the alcohol, before injection, one of the other two reaction components, i. e. either silicon tetrafluoride or ammonia, and to introduce said component in such dissolved form into the reaction chamber, thereby also reducing the reaction temperature.

The following examples serve to illustrate this advantageous embodiment of the present invention without, however, limiting the same thereto.

*Example 10*

A well heat-insulated reaction chamber of 60 l. capacity is used in this experiment. 300 l. of absolutely anhydrous gaseous methanol, 224 l. of ammonia, and 168 l. of silicon tetrafluoride per hour are conducted into said chamber. Silicon tetrafluoride is continuously produced in an endless screw mixer by mixing ammonium fluosilicate, produced in a preceding experiment, with silicic acid and 25% oleum. The reaction chamber was electrically heated, before starting the reaction, to 120° C. As soon as reaction has set in, the temperature rapidly increases to 140° C. and is kept at said temperature by means of a cooling coil. After three hours, introduction of the above mentioned gas mixture is discontinued. 1,400 g. are condensed. They have a silicon dioxide content of 29.75% corresponding to 75.3% of silicic acid methyl ester. The reaction chamber contains 2,670 g. of snowy ammonium fluosilicate. The ester yield, calculated with respect to ammonium fluosilicate formed, is 93% of the theoretical yield.

*Example 11*

The isopropyl ester of silicic acid is produced from isopropanol in the same apparatus and following the same procedure as described in the preceding example. Its boiling point is 185° C. The temperature of the reaction chamber is adjusted to about 180° C. In an analogous manner the isobutyl ester of silicic acid of the boiling point 251° C. is obtained from isobutanol while maintaining the reaction temperature at 200° C. In both instances the ester yield, calculated for precipitated fluosilicate is about 85%.

*Example 12*

Methanol is saturated with silicon tetrafluoride, while cooling. Thereby a viscous solution containing 45% of silicon tetrafluoride is obtained. Said freshly prepared solution is injected at a ratio of 1 kg./hour into the reaction chamber which is initially heated to 120° C. At the same time, ammonia in an amount required to effect neutralization is also introduced into the chamber. Heating is then discontinued. The reaction temperature adjusts itself to 136–138° C. without further cooling. Introduction of the reaction components into the chamber is discontinued after 5 hours. 2,520 g. of ammonium fluosilicates are precipitated in the reaction chamber while 2,940 g. of an ester-alcohol mixture containing 35% of silicic acid methyl ester are collected in the receiver. The yield is 95% of the theoretical yield.

In place of the alcohols used in the preceding examples, there may be employed other alcohols, such as n-propanol, n-butanol, n-amyl alcohol, secondary amyl alcohol, isoamyl alcohol, n-hexanol, phenyl ethanol, cresols, furfuryl alcohol, and others.

In place of ammonia, aniline, or pyridine, there may be used organic amines which are capable of forming amine fluosilicates, such as methylamine, dimethylamine, trimethylamine and other aliphatic, preferably lower alkylamines, cycloaliphatic, aromatic, or heterocyclic amines.

The reaction is preferably carried out at elevated temperature. A temperature of at least 50° C. has proved to be of advantage. The reaction temperature depends, of course, upon the reactivity of the alcohol to be used for esterification and upon the method employed for producing the silicic acid ester. In each instance, the optimum reaction temperature is readily determined by preliminary experiments.

As shown in Example 5, it is also possible to carry out the reaction in the presence of an inert anhydrous organic solvent, such as benzene, toluene, xylene, paraffin hydrocarbons and the like.

To obtain a satisfactory yield it is essential that moisture is excluded during reaction and working up of the reaction mixture and that the reactants are used in completely anhydrous form. Preferably access of air is also excluded and the reaction is carried out in an ammonia or amine atmosphere or in the presence of an inert gas, such as nitrogen and the like.

Of course, many changes and variations may be made in the reaction conditions, the reaction temperature and duration, the methods of working up and purifying the resulting silicic acid ester, and the like in accordance with the principles set forth herein and in the claims annexed hereto.

We claim:

1. In a process of producing silicic acid esters by reacting silicon tetrafluoride with a lower aliphatic alcohol in the presence of ammonia, the step which comprises reacting, in the gaseous phase, silicon tetrafluoride with a lower aliphatic alcohol and ammonia at a temperature just above the temperature at which separation of the silicic acid ester in liquid form from the reaction mixtures takes place, said silicon tetrafluoride, ammonia, and lower aliphatic alcohol being present in the reaction mixture in the proportion of about 3 mols of silicon tetrafluoride to about 4 mols of ammonia to at least about 4 mols of said alcohol.

2. In a process of producing silicic acid esters by reacting silicon tetrafluoride with a lower aliphatic alcohol in the presence of ammonia, the steps which comprise injecting the lower aliphatic alcohol to be reacted in liquid form into the reaction chamber, simultaneously introducing gaseous silicon tetrafluoride and ammonia into said chamber, the rate of injection of the liquid alcohol into said chamber being adjusted so that the temperature in the reaction chamber is maintained just above the temperature at which separation of the silicic acid ester in liquid form from the reaction mixture takes place, said silicon tetrafluoride, ammonia, and lower aliphatic alcohol being present in the reaction mixture in the proportion of about 3 mols of silicon tetrafluoride to about 4 mols of ammonia to at least about 4 mols of said alcohol, conducting the resulting gaseous reaction mixture through the reaction chamber, thereby precipitating the formed ammonium fluosilicate in said chamber, cooling the remaining reaction mixture discharged from the reaction chamber, and condensing the resulting silicic acid ester.

3. In a process of producing silicic acid esters by reacting silicon tetrafluoride with a lower aliphatic alcohol in the presence of ammonia, the steps which comprise injecting the lower aliphatic alcohol to be reacted in liquid form into the reaction chamber, simultaneously introducing gaseous silicon tetrafluoride and ammonia into said chamber, the rate of injection of the liquid alcohol into said chamber being adjusted so that the temperature in the reaction chamber is maintained just above the temperature at which separation of the silicic acid ester in liquid form from the reaction mixture takes place, said silicon tetrafluoride, ammonia, and lower aliphatic alcohol being present in the reaction mixture in the proportion of about 3 mols of silicon tetrafluoride to about 4 mols of ammonia to at least 4 mols of said alcohol, conducting the resulting gaseous reaction mixture through the reaction chamber, thereby precipitating the formed ammonium fluosilicate in said chamber, cooling the remaining reaction mixture discharged from the reaction chamber, condensing the resulting silicic acid ester and the non-reacted alcohol, and returning and injecting part of said ester-alcohol mixture into the reaction chamber to maintain the reaction temperature therein just above the temperature at which separation of the silicic acid ester in liquid form from the reaction mixture takes place.

4. In a process of producing silicic acid esters by reacting silicon tetrafluoride with a lower aliphatic alcohol in the presence of ammonia, the steps which comprise dissolving silicon tetrafluoride in the lower aliphatic alcohol to be reacted, injecting the resulting solution in liquid form into the reaction chamber, simultaneously introducing ammonia thereinto, the rate of injection of the liquid silicon tetrafluoride-alcohol solution into said chamber being adjusted so that the temperature in the reaction chamber is maintained just above the temperature at which separation of the silicic acid ester in liquid form from the reaction mixture takes place, said silicon tetrafluoride, ammonia, and lower aliphatic alcohol being present in the reaction mixture in the proportion of about 3 mols of silicon tetrafluoride to about 4 mols of ammonia to at least about 4 mols of said alcohol, conducting the resulting gaseous reaction mixture through the reaction chamber, thereby precipitating the formed ammonium fluosilicate in said chamber, cooling the remaining reaction mixture discharged from the reaction chamber, and condensing the resulting silicic acid ester.

5. In a process of producing silicic acid esters by reacting silicon tetrafluoride with a lower aliphatic alcohol in the presence of ammonia, the steps which comprise dissolving ammonia in the lower aliphatic alcohol to be reacted, injecting the resulting solution in liquid form into the reaction chamber, simultaneously introducing silicon tetrafluoride thereinto, the rate of injection of the liquid ammonia-alcohol solution into said chamber being adjusted so that the temperature in the reaction chamber is maintained just above the temperature at which separation of the silicic acid ester in liquid form from the reaction mixture takes place, said silicon tetrafluoride, ammonia, and lower aliphatic alcohol being present in the reaction mixture in the proportion of about 3 mols of silicon tetrafluoride to about 4 mols of ammonia to at least about 4 mols of said alcohol, conducting the resulting gaseous reaction mixture through the reaction chamber, thereby precipitating the formed ammonium fluosilicate in said chamber, cooling the remaining reaction mixture discharged from the reaction chamber, and condensing the resulting silicic acid ester.

6. In a process of producing silicic acid esters by reacting silicon tetrafluoride with a lower aliphatic alcohol in the presence of ammonia, the step which comprises reacting, in the gaseous phase, silicon tetrafluoride, with a lower aliphatic alcohol in the presence of ammonia at a temperature at which separation of liquid silicic acid ester from the reaction mixture takes place, said silicon tetrafluoride, ammonia, and lower aliphatic alcohol being present in the reaction mixture in the proportion of about 3 mols of silicon tetrafluoride to about 4 mols of ammonia to at least about 4 mols of said alcohol.

References Cited in the file of this patent

Knop: "Journal Prakt Chemie," volume 74 (1858), pages 41 to 62.

Tarbutton et al.: "Journal American Chemical Society," volume 61 (1939), pages 2555, 2556.

Gierut et al.: "Journal American Chemical Society," volume 58 (1936), pages 786, 787.